Dec. 16, 1969          F. M. WELCH          3,484,836

ROTATING BIOLOGICAL CONTACTOR IN SEWER

Filed July 15, 1968          2 Sheets-Sheet 1

Inventor
Fredrick M. Welch
by Robert C. Sullivan
Attorney

United States Patent Office 3,484,836
Patented Dec. 16, 1969

3,484,836
ROTATING BIOLOGICAL CONTACTOR IN SEWER
Frederick M. Welch, Oconomowoc, Wis., assignor to Allis-Chalmers Manufacturing Company, Milwaukee, Wis.
Filed July 15, 1968, Ser. No. 744,770
Int. Cl. C02c 1/02
U.S. Cl. 210—9                6 Claims

ABSTRACT OF THE DISCLOSURE

A rotating biological contactor is positioned in or adjacent a sewer which carries biodegradable waste and provides a biological treatment for waste flowing past it in the sewer, thereby helping to reduce the organic load on a domestic and/or industrial waste treatment plant downstream of the rotating biological contactor or reducing the pollution of the sewage where it is discharged directly to a waterway.

BACKGROUND OF THE INVENTION

Field of the invention

This invention relates to a sewage treatment apparatus and method and more particularly to a sewage treatment apparatus and method utilizing a rotating biological contactor in or adjacent a sewer which carries biodegradable waste.

Description of the prior art

It is known in the art of sewage treatment to utilize in the secondary or biological treatment step what may be referred to as a "rotating biological contactor" including a rotating member which is covered with aerobic bacterial slime and which is rotated so as to bring the biological slime on the rotating member alternately into contact with the sewage being treated and with the oxygen-containing atmosphere.

A preferred form of rotating biological contactor is shown by British Patent No. 935,162 which shows the use of a plurality of disk members extending parallel to the direction of sewage flow and mounted on a shaft, which extends transverse of the direction of sewage flow. The disk members are coated with a bacterial film, and are rotated into alternate contact with atmospheric oxygen and with the sewage to be treated. The bacterial slime on the rotating disks consists principally of aerobic bacteria which have the ability to adsorb, absorb, coagulate and oxidize the undesirable organic constituents of the sewage and to change such constitutents into unobjectionable forms of matter. The presence of the biological film or slime on the rotating disks also greatly increases the transfer of oxygen to the sewage through which the disks rotate thereby promoting the multiplication or synthesis of the aerobic bacteria already present in the sewage or sloughed from the rotating disks, and in the bacterial film on the disks, as well as increasing the ability of the aerobic bacteria to act upon the sewage and reduce it to unobjectionable forms.

Treatment plants for domestic or industrial waste are frequently overloaded and provide inadequate treatment of the waste delivered to the plant. As a result of such overloading, inadequately treated domestic or industrial waste is frequently discharged to the nation's waterways.

Conditions in sewers frequently encourage the growth of anaerobic bacteria which can cause reactions producing harmful and obnoxious gases in the sewer, such as hydrogen sulphide ($H_2S$), methane ($NH_4$) and carbon dioxide ($CO_2$). Hydrogen sulphide gas is particularly undesirable in a concrete sewer since it reacts with the concrete to degrade and weaken the sewer structure.

Accordingly, it is an object of the present invention to provide a rotating biological contactor in or adjacent a sewer which carries biodegradable waste to help reduce the organic load on domestic and/or industrial waste water treatment plants.

It is another object of the invention to provide an apparatus for and method of biologically treating sewage waste in a sewer line before it reaches the sewage treatment plant or before it is discharged into a waterway.

Still another object of the invention is to provide an apparatus for and method of biologically treating biodegradable sewage waste in a sewer line which "freshens" the sewage by increasing the dissolved oxygen content of the sewage, thereby discouraging the growth of undesirable anaerobic bacteria in the sewage.

Still another object of the invention is to provide an apparatus for and method of biologically treating biodegradable sewage waste in a sewer line which provides biological treatment not only of sewage introduced into the sewer line upstream of the treating apparatus, but also provides a biological treatment of sewage introduced into the sewage line downstream of the treating apparatus.

Still another object of the invention is to provide an apparatus for and method of biologically treating biodegradable sewage which discourages or inhibits the growth of anaerobic bacteria which are a cause of harmful and obnoxious gases, at least one of which gases reacts with concrete sewers to degrade and weaken the sewer structure.

In achievement of these objectives, there is provided in accordance with this invention an apparatus for and method of sewage treatment in accordance with which a rotating biological contactor is positioned in or adjacent a sewer which carries biodegradable waste. The rotating biological contactor provides a biological treatment for the waste flowing past it in the sewer and thereby helps to reduce the organic load on a domestic and/or industrial waste water treatment plant downstream of the rotating biological contactor. Furthermore, the use of the rotating biological contactor in the sewer inhibits the growth of anaerobic bacteria in the sewer which produce harmful and obnoxious gases. A further feature and advantage of the use of the rotating biological contactor in the sewer line is the fact that the microorganisms which are sloughed off the rotating biological contactor pass downstream of the rotating biological contactor and in effect constitute and provide additional biological treatment of the sewage downstream of the rotating biological contactor, particularly sewage which is admitted to the sewer line downstream of the rotating biological contactor.

Further objects and advantages of the invention will become apparent from the following description taken in conjunction with the accompanying drawings in which:

DESCRIPTION OF THE PREFERRED EMBODIMENT

Figure 1:
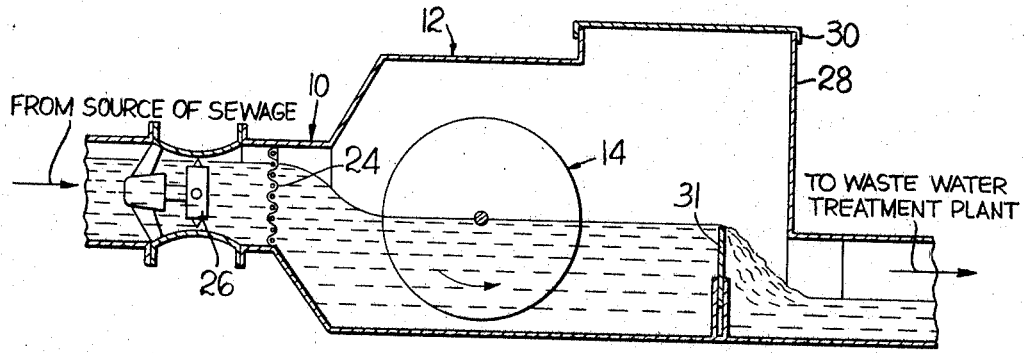
FIG. 1 is a view in vertical section of a sewer line having a rotating biological contactor installed therein in accordance with this invention.

Referring now to the drawings, there is generally indicated at 10 a sewer line which receives waste water and sewage from a source of domestic and/or industrial waste. The sewer 10 discharges to a waste treatment plant or to a waterway which may possibly be a considerable distance downstream from the rotating biological contactor installation, to be described. The sewer 10 is provided at a point downstream of the source of waste with an enlarged section generally indicated at 12 in which is installed at least one rotating biological contactor assembly generally indicated at 14. The rotating biological contactor is preferably of the form shown by British Patent No. 935,162 and includes a plurality of disk members 16 extending parallel to the direction of sewage flow and mounted on a shaft 20 extending transverse to the direction of sewage flow and which is rotatably driven by any suitable drive means 22 such as for example, a variable speed electric motor. The shaft 20 and the disks 16 mounted thereon, may rotate at any suitable speed such as, for example, 5 r.p.m. but may possibly rotate at higher speeds, such as 40 r.p.m. These values of rotational speed are given only as examples and are not meant to be limiting in any respect. Disk diameters may be in the range, for example, of 3 feet to 10 feet.

The disk members 16 are coated with an aerobic bacterial film which may be seeded on the disks, but which accumulates naturally on the disks after several days contact with the sewage passing through the sewer. The shaft 20 is mounted at such height that at least some portion of the rotating disks will be above the surface of the waste water and sewage during the upper portion of the rotation of the disks, so that the disk members are rotated into alternate contact with atmospheric oxygen above the level of the sewage, and with the sewage to be treated. The bacterial slime or film on the rotating disks consists principally of aerobic bacteria which have the ability to adsorb, absorb, coagulate and oxidize the undesirable organic constituents of the sewage and to change such constituents into unobjectionable forms of matter. Hereinafter in the specification and claims, the term "rotating biological contactor" will be used to describe a rotatable apparatus or assembly which alternately contacts the sewage and an oxygen-containing atmosphere, and which is preferably of the type shown by British Patent No. 935,162.

A suitable screen device 24 is interposed in the sewer line 10 before the enlarged section 12 to prevent the passage of foreign objects and the like which might damage the rotating biological contactor or the sewage treatment plant downstream thereof. Also, a grinding or comminuting means 26 is provided adjacent the screen 24 to condition the solids in the sewage for treatment by or passage through the rotating biological contactor. Such screening and comminuting apparatus are well known in the art and form no part of this invention.

An access opening 28 having a removable cover 30 is provided adjacent the enlarged section 12 of the sewer to permit access to the interior of the enlarged section 12 for repair or maintenance of the rotating biological contactor.

In order to insure an adequate supply of air in the sewer, suitable vents to the atmosphere may be provided if required along the sewer line or lines. Means may be provided for forcing air or other oxygen-containing gas through the sewer line or lines.

The rotating biological contactor by contacting the waste water or sewage passing thereby, as previously mentioned, removes the undesirable organic constituents of the sewage or waste water, thereby reducing the organic loading on the main treatment plant to which the sewer 10 is connected downstream of the rotating biological contactor, or reducing the pollution of the sewage if it discharges into a waterway, instead of discharging into a sewage treatment plant.

As previously pointed out, the installation of the rotating biological contactor in the sewer line not only provides a biological action by the contact between the rotating disks and the bacterial film thereon with the sewage, which removes the undesirable organic constituents of the sewage, but furthermore, the contact of the rotating disks with the sewage permits and increases the transfer of oxygen to the sewage to increase the dissolved oxygen content of the sewage, thereby "freshening" the sewage and inhibiting and discouraging the growth of anaerobic bacteria, the presence of which produces harmful and obnoxious gases in the sewer, such as hydrogen sulphide ($H_2S$), methane ($NH_4$), and carbon dioxide ($CO_2$). As previously pointed out, hydrogen sulphide gas is particularly undesirable in a concrete sewer since it reacts with the concrete to degrade and weaken the sewer structure. Therefore, by promoting a condition which inhibits the growth and survival of anaerobic bacteria, the rotating biological contactor helps to prolong and extend the life of the concrete sewer structure.

A further significant advantage of installing the rotating biological contactor in the sewer line as just described is the fact that excess aerobic bacteria forming part of the film coating on the disks 16 slough off of the disks during the operation thereof and pass downstream of the rotating biological contactor where the bacteria acts upon the sewage downstream of the rotating biological contactor to further remove organic impurities from the sewage and waste water as well as to biologically treat sewage fed to the sewer line downstream of the rotating biological contactor. Even if the sewage is not transmitted to a sewage treatment plant downstream of the rotating biological contactor assembly, but is instead discharged into a waterway, the sewage or waste water so discharged will be in a less polluted condition because of the rotating biological contactor assembly in the sewer line, as described.

In the apparatus shown in the drawings and described in the specification, the sewage and waste water flowing through the sewer line 10 flows continuously over weir 31. Furthermore, the primary sludge, the secondary sludge and the grit all pass downstream of the rotating biological contactor 14 to the waste treatment plant. If the treated waste is discharged to a body of water, such as a stream river or the like, some means may be provided for separating solids from the liquid component of the treated waste.

Figure 2:
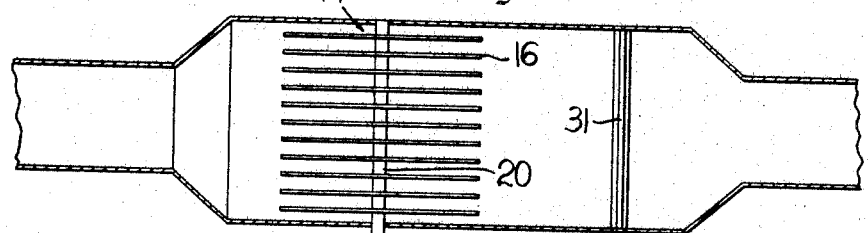
FIG. 2 is a view in horizontal section of the sewer line of FIG. 1.
Figure 3:
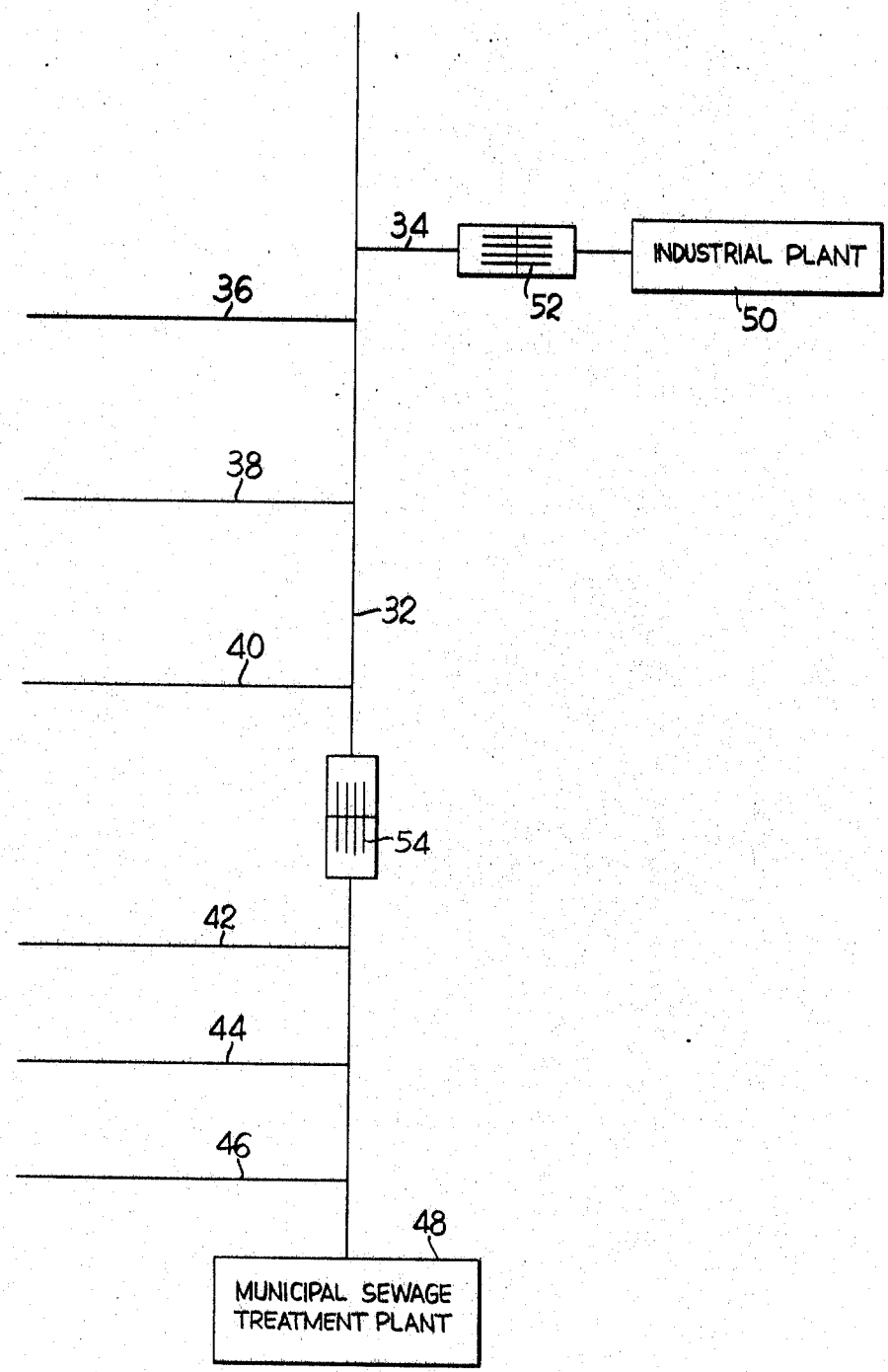
FIG. 3 is a diagrammatic view showing the rotating biological contactor in a typical relationship to a main sewer line and to feeder sewer lines.

There is diagrammatically shown in FIG. 3 a typical sewer system in which a rotating biological contactor might be installed in accordance with the invention. Thus, there is shown a main sewer line 32. A plurality of feeder lines 34, 36, 38, 40, 42, 44 and 46 feed into the main sewer line 32. The sewer line 32 discharges at its far end, that is beyond the connection of feeder line 46, to a municipal sewage treatment plant 48. It will be noted that an industrial plant 50 which is assumed to discharge biodegradable waste, feeds the waste discharged therefrom to the feeder line 34. A rotating biological contactor 52 of the type shown in FIGS. 1 and 2 is connected in feeder line 34, and thus, the biodegradable waste from industrial plant 50 is treated by the rotating biological contactor 52 prior to the discharge of the sewage from feeder 34 into the main sewer line 32.

It will also be noted that a rotating biological contactor 54, which may be similar to the apparatus 52 and also similar to the apparatus shown in FIGS. 1 and 2, is connected directly in series with main sewer line 32 at a point intermediate the connections of the feeder lines 40 and 42 to main sewer line 32. Thus, feeder lines 34, 36, 38 and 40 are all connected to main sewer line 32 upstream of the rotating biological contactor 54, so that the waste from the feeder lines just mentioned (34, 36, 38 and 40) is treated by the rotating biological contactor 54, since the waste from those feeder lines passes directly through the rotating biological contactor 54. Of course the sewage discharge from feeder line 34 into main sewer line 32 has already been treated by the rotating biological contactor 52 and thus has at least a substantial portion of its biodegradable pollution removed before discharging into main sewer line 32. The rotating biological contactor 54 is of such size and proportions and has a number of disks such that a substantial portion if not all of the biodegradable organic material reaching the rotating biological contactor 54 will be removed by the apparatus 54 upon passing therethrough. It will be noted that the sewer-feeder lines 42, 44 and 46 are all located downstream of the rotating biological contactor 54, and therefore, the sewage discharged from feeder lines 42, 44 and 46 does not pass through the rotating biological contactor 54. However, as has previously been pointed out, a feature and advantage of the use of the rotating biological contactor in the sewer line is the fact that the microorganisms which are sloughed off by the rotating biological contactor during the operation thereof pass downstream of the rotating biological contactor and in effect constitute and provide additional biological treatment of the sewage downstream of the rotating biological contactor. therefore, the microorganisms (principally of the aerobic type) which have been sloughed off the rotating disks of the rotating biological contactor 54 and have passed downstream thereof provide some biological treatment of the sewage discharged from the feeder lines 42, 44 and 46 into the sewer line 32 downstream of the rotating biological contactor 54. Also, the microorganisms which are sloughed off the rotating disks of rotating biological contactor apparatus 52 and pass into main sewer line 32 provide some biological treatment of the sewage from the feeder lines 36, 38 and 40 as the sewage from those lines is passing along the main sewer line 32 upstream of and before reaching the rotating biological contactor 54.

Figure 4:
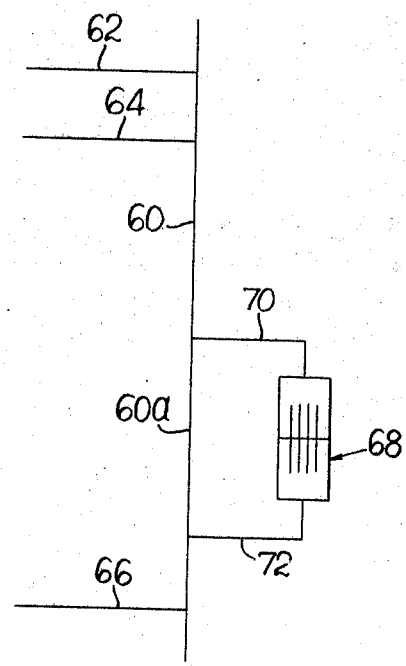
FIG. 4 is a diagrammatic view of a modified connection of a rotating biological contactor to a sewer line.

There is shown in FIG. 4 a modified arrangement in which the rotating biological contactor is connected in parallel with the sewer line, rather than being connected in series with the sewer line. Thus, as seen in FIG. 4, there is shown a sewer line 60 having feeders 62, 64 and 66 connected thereto. A rotating biological contactor, generally indicated at 68, is installed in parallel relation to portion 60A of sewer line 60 intermediate the connection of feeders 64 and 66 to sewer line 60. Section 60A of sewer 60 is in direct series connection with the sewer 60 and forms a series connected part thereof.

Rotating biological contactor 68 is connected by conduits 70 and 72 in bypass relation to section 60A of sewer line 60. Suitable deflecting means or the like may be provided adjacent the junction of conduit 70 to sewer line 60 to cause a predesired proportionate flow of sewage through by-pass conduit 70 into the rotating biological contactor 68. Thus, a certain portion of the flow of sewer 60 which reaches the junction of sewer 60 and of conduit 70 passes through the rotating biological contactor apparatus 68 and is biologically treated thereby in the manner previously described. The remaining portion of the sewage in sewer 60 which passes the junction of sewer 60 and conduit 70 does not pass through the rotating biological contactor 68 and is thus not directly acted upon by the rotating biological contactor 68. However, the sewage in sewer 60 which does not pass directly through the rotating biological contactor 68 derives some benefit from the presence of the rotating biological contactor 68 due to the fact that microorganisms sloughed off of the rotating disks of the apparatus 68 pass through conduit 72 and thus into the downstream portion of the sewer line 60 and act upon the untreated sewage (that is, the sewage which did not pass through the rotating biological contactor 68), removing some of the pollution therefrom, as previously described. Furthermore, the microorganisms sloughed off of the rotating disks of the rotating biological contactor 68, as just described, which pass into the downstream portion of the sewer line 60 provide some biological treatment for sewage from feeder sewer lines, such as feeder sewer line 66, which are connected to sewer 60 downstream of the rotating biological contactor 68.

While there have been shown and described particular embodiments of the invention it will be obvious to those skilled in the art that various changes and modification may be made therein without departing from the invention, and, therefore, it is aimed to cover all such changes and modifications as fall within the true spirit and scope of the invention.

The embodiments of the invention in which an exclusive property or privilege is claimed are defined as follows:

1. In combination, a sewer line adapted to receive biodegradable waste material from a source of waste and to discharge said waste material downstream of said source, a conduit means connected to said sewer line in parallel flow relation to a portion of the length of said sewer line intermediate the length of said sewer line whereby a portion of the waste material flows through said conduit means, means for controlling the division of flow of biodegradable waste between said portion of said length of said sewer line and said conduit means, a biological contactor mounted for movement in said conduit means, and means for moving said biological contactor alternately into contact with biodegradable waste flowing through said conduit means and into contact with an oxygen-containing atmosphere.

2. The combination defined in claim 1 in which said biological contactor is mounted for rotation, and including means for rotating said biological contactor alternately into contact with biodegradable waste flowing through said conduit means and into contact with an oxygen-containing atmosphere.

3. The combination defined in claim 1 in which said conduit means comprises an enlarged section, and said biological contactor is mounted for movement in said enlarged section.

4. The combination defined in claim 2 in which said biological contactor comprises a shaft and a plurality of disk members mounted on said shaft.

5. The method of treating biodegradable waste flow through a sewer line which comprises the steps of passing a controlled portion of the biodegradable waste through a conduit means which is connected in parallel flow relation to a portion of the length of the sewer line intermediate the length of the sewer line, and of moving a biological contactor in the conduit means alternately into contact with the biodegradable waste passing through the conduit means and into contact with an oxygen-containing atmosphere.

6. The method of treating biodegradable waste as defined in claim 5 in which said biological contactor is rotated.

References Cited

UNITED STATES PATENTS

| 1,963,354 | 6/1934 | Currie | 210—221 X |
| 2,798,042 | 7/1957 | Cox | 210—15 |
| 3,335,081 | 8/1967 | El-Naggar | 210—15 |

FOREIGN PATENTS

| 1,230,940 | 4/1960 | France. |

MICHAEL E. ROGERS, Primary Examiner

U.S. Cl. X.R.

210—17, 150